UNITED STATES PATENT OFFICE.

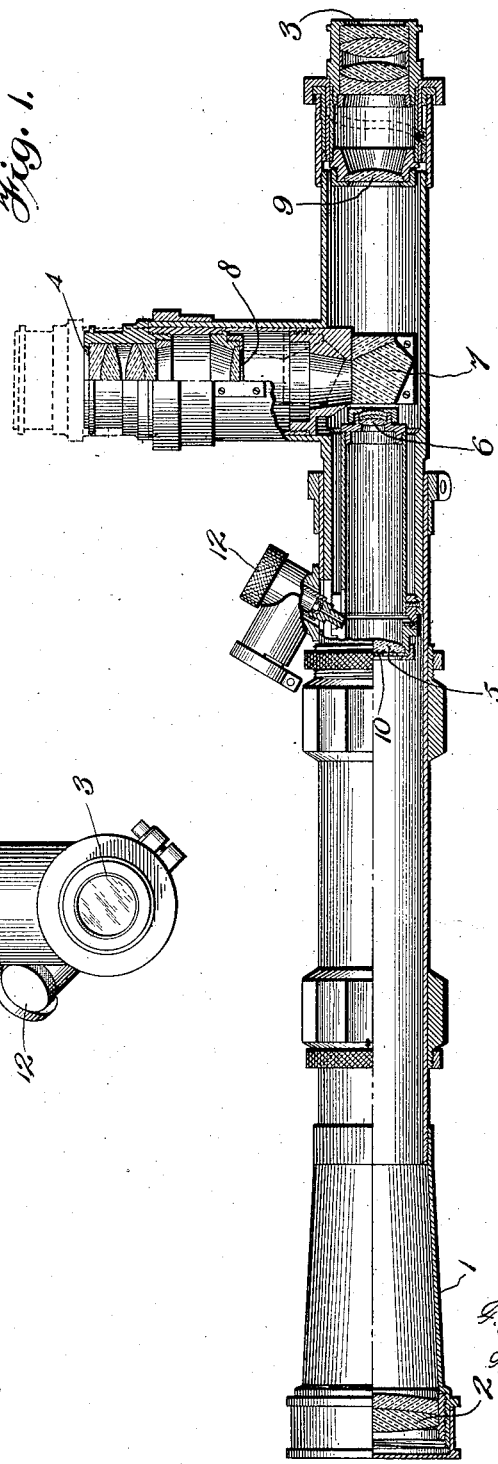

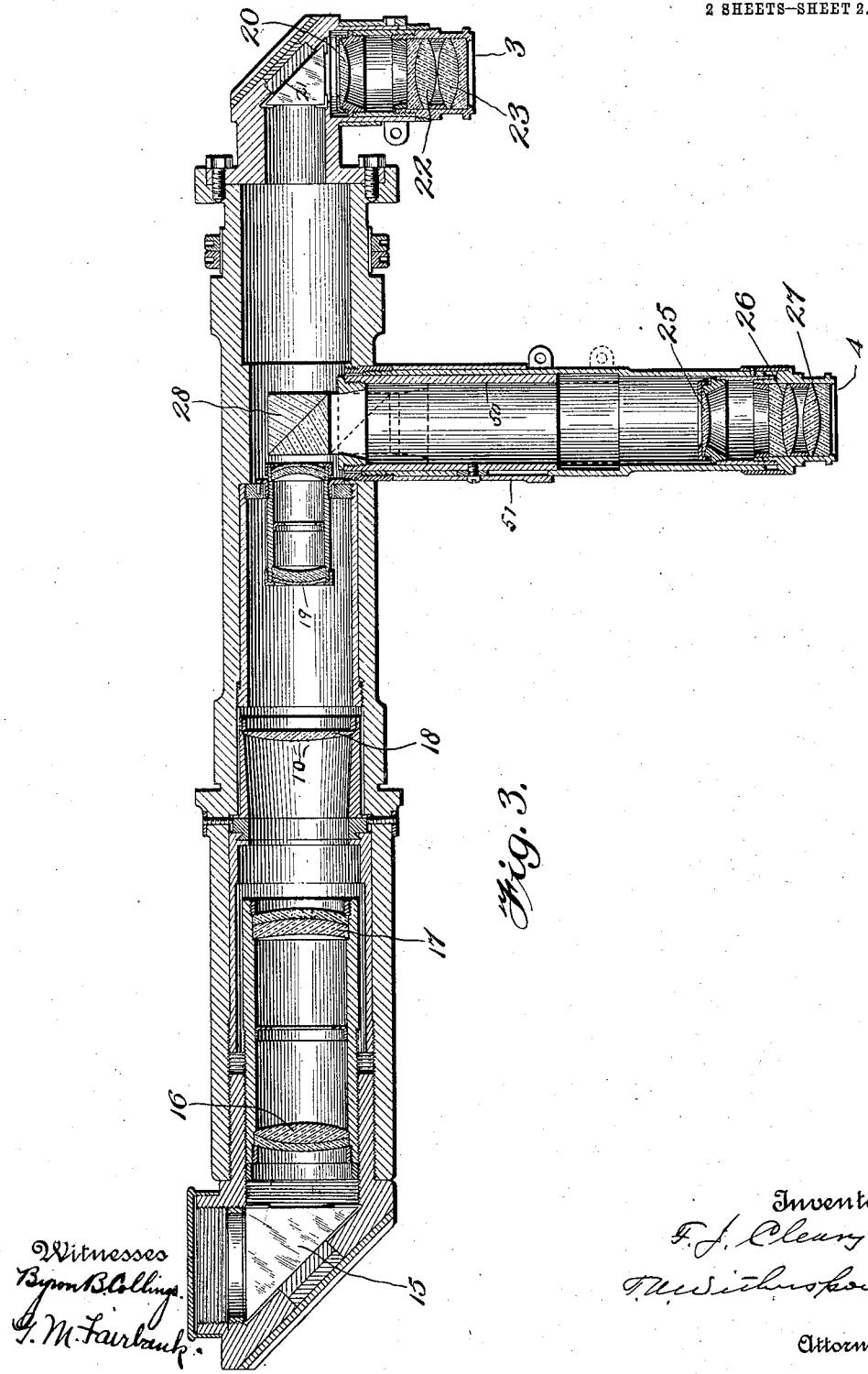

FRANCIS J. CLEARY, OF WASHINGTON, DISTRICT OF COLUMBIA.

SIGHTING-TELESCOPE.

1,086,140.  Specification of Letters Patent.  Patented Feb. 3, 1914.

Application filed April 18, 1913. Serial No. 761,966.

*To all whom it may concern:*

Be it known that I, FRANCIS J. CLEARY, lieutenant, U. S. Navy, a citizen of the United States, residing at Washington, District of Columbia, have invented certain new and useful Improvements in Sighting-Telescopes; and I do hereby declare the following to be a full, clear, and exact description of the invention, such as will enable others skilled in the art to which it appertains to make and use the same.

My invention relates to sighting telescopes having two eye pieces one for the gun pointer and the other for the instructor, and which are especially adapted for naval ordnance.

It has for its object to produce a practical construction as well as to render more efficient this particular type of instrument.
With these and other objects in view the invention consists in the novel details of construction and combinations of parts more fully hereinafter disclosed and particularly pointed out in the claims.
Referring to the accompanying drawings forming a part of this specification in which like numerals designate like parts in all the views:—Figure 1 is a longitudinal sectional view of a telescope made in accordance with my invention; Fig. 2 is an end elevational view of the parts shown in Fig. 1; and Fig. 3 is a longitudinal view of a modified form of my invention.

1 indicates the barrel, 2 the objective, 3 the gun pointer's eye piece and 4 the instructor's or checking eye piece.

In order that the target may appear in an upright position I further provide the usual collective lens 5 and projecting lens 6, as well as a reflecting prism 7 to permit a portion of the light received from the objective to pass to each eye piece, all as is well known. In this type of instrument heretofore known, however, there have been two sets of cross lines, one in each eye piece; the set of cross lines in the checking eye piece 4 required frequent adjustment to maintain its coincidence with the cross lines in the pointer's eye piece 3. This adjustment was very delicate and hard to make and there was always present the probability that a jar or shock would throw the two sets of cross lines out of coincidence with each other, rendering the checking mechanism of the telescope often worse than useless. Another serious defect of this type of telescope heretofore in use was that, in an endeavor to make the cross lines in the checking eye piece remain in coincidence with the cross lines in the pointer's eye piece when once adjusted, the checking eye piece was made rigid and immovable. One half of the light was thus permanently diverted from the pointer's eye piece by means of the prism 7 and thereby rendering the telescope inefficient at night or on a dark day when the full exit pupil or maximum of light was needed. My improvements overcome these defects in the following manner. Both sets of cross lines are removed from their usual places at the lenses 8 and 9 in the planes of the erected images, and a single set placed at the lens 5 in the plane of the inverted image formed by the objective. Since this inverted image is erected by the erecting system and viewed by both eye pieces, the one and same set of cross lines 10 is seen through both eye pieces, thus rendering necessary only one set of cross lines, and effectually doing away with the annoyance and unreliability of the two sets of cross lines heretofore used as well as the probable chances of their getting out of coincidence.

Another improvement and important feature of my invention lies in the movable checking eye piece 4. As there is but one set of cross lines, it is not necessary that the checking eye piece be made rigid and immovable as heretofore. The said checking eye piece is accordingly constructed to draw in and out so that at night or on a dark day, the prism 7 associated therewith can be withdrawn so as to entirely clear the path of the rays of light, as indicated in dotted lines, thus permitting all the light entering the telescope to pass through the pointer's eye piece 3, he thus using the full exit pupil, obtaining a maximum of light, and utilizing the full efficiency of the telescope as a night glass. When the checking eye piece is withdrawn, however, it will, of course, be necessary to refocus the pointer's eye piece, but this may be done by the usual, or any suitable, means.

12 indicates the usual lighting means for the lens 5 and cross lines 10.

In the modified form of instrument illustrated in Fig. 3, the same principles are present. That is to say, 15 indicates a reflecting means, 16 and 17 the objective lenses, 18 a cross line lens, and 19 an erecting system. On the lens 18 in the first focal plane of the objective are engraved the cross lines 10. A primary or pointer's eye piece is shown at 3, consisting of a collective lens 20, a reflecting means 21, and two doublet lenses 22 and 23; while at 4 is illustrated a checking eye piece comprising a collective lens 25, and two doublet lenses 26 and 27.

28 indicates a prism for passing light to the eye piece 3, and reflecting light to the eye piece 4.

The cross lines 10 in this form of instrument being also in the first focal plane of the objective, the above objections relating to said lines are effectually overcome. The prism 28 is movable in and out of the path of the rays passing to the eye piece 3, on the tube 50 and sleeve 51, as indicated in dotted lines, and therefore this telescope can also be used with a full exit pupil.

It is obvious that those skilled in the art may vary the arrangement of parts as well as the details of construction without departing from the spirit of my invention and therefore I do not wish to be limited to the above disclosure except as may be required by the claims.

What I claim is:—

1. In a sighting telescope the combination of an objective; cross lines in the focus of said objective; a primary eye piece coacting with said objective; a checking eye piece also coacting with said objective, and a movable member provided with a reflecting means for said cross lines associated with both of said eye pieces; substantially as described.

2. In a sighting telescope the combination of an objective; cross lines in the focus of said objective; a primary eye piece coacting with said objective; a checking eye piece also coacting with said objective; a movable member provided with a reflecting means associated with said eye pieces; and an erecting means located between said objective and eye pieces, substantially as described.

3. In a sighting telescope the combination of an objective; cross lines in the focus of said objective; a primary eye piece coacting with said objective; a checking eye piece also coacting with said objective and a movable reflecting prism located between said objective and eye pieces, substantially as described.

4. In a sighting telescope the combination of an objective; cross lines in the focus of said objective; a primary eye piece coacting with said objective; a checking eye piece also coacting with said objective; means for deflecting light from said objective into one of said eye pieces while transmitting it into the other; and means for removing said light deflecting means out of the path of the ray entering said other eye piece, substantially as described.

5. In a sighting telescope the combination of an objective; cross lines in the focus of said objective; a primary eye piece coacting with said objective; a checking eye piece also coacting with said objective; an erecting system between said objective and said eye pieces; means for artificially lighting said cross lines; means for deflecting light from said objective into one of said eye pieces while transmitting it into the other; and means for removing said light deflecting means out of the path of the ray entering said other eye piece, substantially as described.

6. In a sighting telescope the combination of an objective; cross lines in the focal plane of said objective; a primary eye piece coacting with said objective; and a movable checking eye piece carrying a deflecting prism, also, coacting with said objective, substantially as described.

In testimony whereof I affix my signature, in presence of two witnesses.

FRANCIS J. CLEARY.

Witnesses:
JOHN H. SIGGERS,
T. A. WITHERSPOON.